US012748078B2

(12) United States Patent
Safai

(10) Patent No.: US 12,748,078 B2
(45) Date of Patent: Sep. 29, 2026

(54) CARBON NANOTUBE ACOUSTIC LENS FOR UNDERWATER HIGH INTENSITY ACOUSTIC DELIVERY

(71) Applicant: The Boeing Company, Arlington, VA (US)

(72) Inventor: Morteza Safai, Newcastle, WA (US)

(73) Assignee: THE BOEING COMPANY, Arlington, VA (US)

( * ) Notice: Subject to any disclaimer, the term of this patent is extended or adjusted under 35 U.S.C. 154(b) by 328 days.

(21) Appl. No.: 18/638,347

(22) Filed: Apr. 17, 2024

(65) Prior Publication Data

US 2025/0329321 A1 Oct. 23, 2025

(51) Int. Cl.

| | |
|---|---|
| ***G01N 29/22*** | (2006.01) |
| ***B82Y 15/00*** | (2011.01) |
| ***C01B 32/158*** | (2017.01) |
| ***G01N 29/04*** | (2006.01) |
| ***G01N 29/28*** | (2006.01) |
| ***G01N 29/34*** | (2006.01) |
| ***G10K 11/30*** | (2006.01) |

(52) U.S. Cl.

CPC ............ *G01N 29/221* (2013.01); *B82Y 15/00* (2013.01); *C01B 32/158* (2017.08); *G01N 29/041* (2013.01); *G01N 29/28* (2013.01); *G01N 29/343* (2013.01); *G10K 11/30* (2013.01)

(58) Field of Classification Search

CPC .... G01N 29/041; G01N 29/221; G01N 29/28; G01N 29/343; C01B 32/158; B82Y 15/00; G01K 11/30

See application file for complete search history.

(56) References Cited

U.S. PATENT DOCUMENTS

| | | | | |
|---|---|---|---|---|
| 4,986,125 | A | 1/1991 | Omura et al. | |
| 9,601,103 | B2 * | 3/2017 | Guo | G10K 11/36 |
| 10,539,538 | B2 * | 1/2020 | Safai | G01N 29/043 |

(Continued)

FOREIGN PATENT DOCUMENTS

| | | | |
|---|---|---|---|
| CN | 100593391 | C | 3/2010 |

OTHER PUBLICATIONS

Safai, Morteza, "Variable Plasma Pulse Generator for Bondline Strength Verification," U.S. Appl. No. 18/301,391, filed Apr. 17, 2023.

(Continued)

*Primary Examiner* — Kristina M Deherrera
*Assistant Examiner* — Jean F Morello
(74) *Attorney, Agent, or Firm* — MH2 Technology Law Group LLP

(57) ABSTRACT

A system and method for evaluating a bond using an acoustic lens is provided. The acoustic lens focuses an underwater plasma generated compression wave towards a bond in a structure being inspected. The acoustic lens can be formed of a plurality of cylindrical shaped structures, each of the cylindrical shaped structures can be formed of a material that possesses a stiffness and a strength to withstand damage from the underwater plasma and resultant compression wave, such as, for example, carbon nanotubes. The length and diameter dimensions of each of the plurality of cylindrical shaped structures can be configured to phase shift the compression wave towards the structure being inspected.

20 Claims, 7 Drawing Sheets

(56) References Cited

U.S. PATENT DOCUMENTS

| | | | | |
|---|---|---|---|---|
| 11,953,471 | B2 | 4/2024 | Safai | |
| 12,416,605 | B2 * | 9/2025 | Bivolarsky | G01N 29/032 |
| 2012/0067128 | A1 | 3/2012 | Oberhoff et al. | |
| 2012/0250908 | A1 * | 10/2012 | Jiang | H04R 23/002 381/164 |
| 2012/0298623 | A1 * | 11/2012 | Jiang | C23F 1/02 156/247 |
| 2015/0316511 | A1 | 11/2015 | Guo | |
| 2020/0258494 | A1 | 8/2020 | Obi | |

OTHER PUBLICATIONS

Safai, Morteza, "Under Water Acoustics Plasma Generator," U.S. Appl. No. 18/597,395, filed Mar. 6, 2024.

Baac et al., "Carbon-Nanotube Optoacoustic Lens for Focused Ultrasound Generation and High-Precision Targeted Therapy," Scientific Reports, Dec. 18, 2012, vol. 2, Report No. 989, 8 pages.

Extended European Search Report for European Application No. 25155614.8 dated Dec. 4, 2025, 10 pages.

* cited by examiner

CARBON NANOTUBE ACOUSTIC LENS FOR UNDERWATER HIGH INTENSITY ACOUSTIC DELIVERY

FIELD OF THE DISCLOSURE

The present disclosure is directed to an acoustic lens. More particularly, the present disclosure is directed to an acoustic lens for focusing a compression wave generated by an underwater plasma and used for evaluating a bond between two components.

BACKGROUND

An underwater plasma generated compression wave can be used to inspect the quality of an adhesive bond in a structure. During inspection, a plasma is created in a liquid by providing an electrical pulse to a pair of electrodes in the liquid. The resultant plasma generates a compression wave. The compression wave propagates through the liquid into a structure to be inspected. The structure can be, for example, a composite structure including a carbon fiber reinforced polymer (CFRP)-to-CFRP bond or CFRP-to-metal bond. The compression wave mechanically creates a stress load on the adhesive bond. During exposure to this load, a weak bond will fail, and a strong bond will not. Structures with weak bonds are thus identified and repaired or discarded.

The plasma generated underwater compression wave propagates outwards in all directions from its source such that the intensity of the compression wave is inversely proportional to the square of the distance from the source. In other words, as the compression wave moves further away from the plasma source, the energy per unit area decreases. Problems may arise if the intensity or energy per unit area of the compression wave applies an insufficient stress load on the adhesive bond. One solution is to increase the intensity of the compression wave by increasing the electrical pulse. This would require, however, a larger and more expensive power supply. It would be desirable to increase the intensity of the compression wave at the structure to be inspected without requiring a larger and more expensive power supply.

SUMMARY

An acoustic lens is disclosed that includes an array of tubular shaped structures, wherein each tubular shaped structure of the array comprises a length and a diameter, a long axis of each tubular shaped structure of the array is oriented in a same direction, the array of tubular shaped structures is formed of a plurality of carbon nanotubes; an incident side of the acoustic lens formed by a first end of the array of tubular shaped structure comprises a concave shape, and the length and the diameter of each tubular shaped structure of the array are configured to phase shift a compression wave.

A method for evaluating a bond is disclosed, the method including placing an open portion of a first vessel against a bonded structure being inspected; pulling a vacuum between an outer surface of the first vessel and an inner surface of a second vessel that encloses the first vessel, wherein pulling the vacuum seals the first vessel to the bonded structure; filling the first vessel with a liquid, wherein the liquid contacts a surface of the bonded structure to be inspected at the open portion; initiating a spark discharge in the liquid to form a plasma that generates a compression wave in the liquid, using an acoustic lens to focus the compression wave to a focal point at or near the surface of the bonded structure to apply a force to a bond in the bonded structure; and inspecting the bond in the bonded structure.

A system for evaluating a bond is disclosed, the system including a first vessel having one or more sidewalls and an endwall, a liquid port configured to connect to a source to fill the first vessel with a liquid, and an open portion configured to be placed against a bonded structure to be inspected; a second vessel surrounding the open portion of the first vessel, comprising a vacuum port configured to connect to a vacuum system to pull a vacuum in a space between an outer surface of the first vessel and an inner surface of the second vessel when the open portion of the first vessel and an open portion of the second vessel are adjacent to the bonded structure to be inspected; a pair of electrodes disposed within the first vessel and positioned to generate a compression wave in the liquid within the first vessel directed towards the bonded structure to be inspected, and an acoustic lens disposed within the first vessel between the pair of electrodes and the open portion, wherein the acoustic lens comprises an array of tubular shaped structures formed of carbon nanotubes, and wherein a length and diameter of each tubular shaped structure is configured to phase shift the compression wave.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate aspects of the present teachings and together with the description, serve to explain the principles of the present teachings.

Figure 1A:
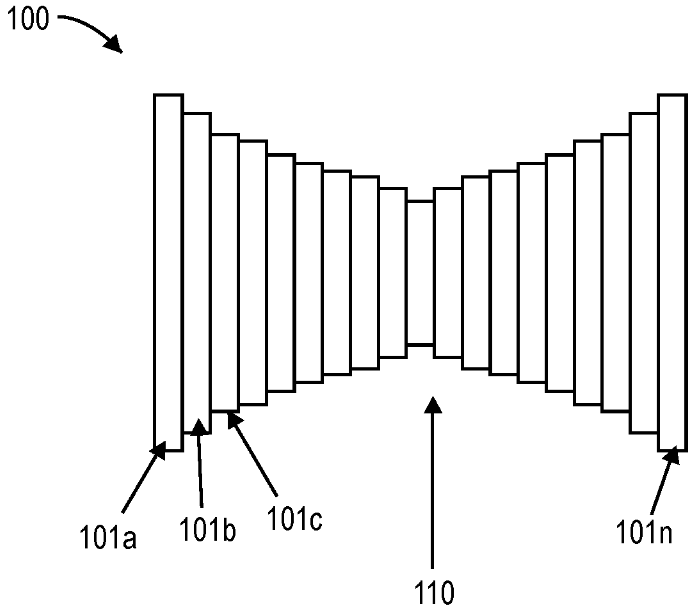
FIG. 1A schematically illustrates a side view of an acoustic lens, according to an implementation.

It should be noted that some details of the figures have been simplified and are drawn to facilitate understanding rather than to maintain strict structural accuracy, detail, and scale.

DESCRIPTION

Reference will now be made in detail to the present teachings, examples of which are illustrated in the accompanying drawings. In the drawings, like reference numerals have been used throughout to designate identical elements. In the following description, reference is made to the accompanying drawings that form a part thereof, and in which is shown by way of illustration specific examples of practicing the present teachings. The following description is, therefore, merely exemplary.

The present disclosure is directed to an acoustic lens for focusing an underwater plasma generated compression wave. As used herein, the term "underwater" refers to submersion in any liquid suitable for forming a plasma and propagating the resultant compression wave towards a bond in a structure being inspected. Compression waves are also referred to herein as stress waves or longitudinal waves. The disclosed acoustic lens, formed of a plurality of cylindrical shaped structures, possesses a stiffness and a strength to withstand damage from the plasma and resultant compression wave. The length and diameter dimensions of each of the plurality of cylindrical shaped structures is configured to phase shift the compression wave towards the structure being inspected.

FIG. 1A schematically depicts a side view of an acoustic lens 100 according to the present teachings. An array of tubular shaped structures 101*a*, 101*b*, 101*c* to 101*n* form acoustic lens 100. Each tubular shaped structure 101*a*, 101*b*, 101*c* to 101*n* can be formed of a plurality of carbon nanotubes (CNTs), such as, for example, single walled CNTs, multi-walled CNTs, or both. The CNTs provide acoustic lens 100 sufficient stiffness and strength to withstand deformation and damage from the underwater plasma and the compression wave. Acoustic lens 100 can have a stiffness in terms of Young's modulus of about 0.1 to about 5.0 TPa, about 1.0 to about 4.0 TPa, or about 1.5 to about 3.0 TPa. Acoustic lens 100 can further have strength in terms of tensile strength of about 50 to about 200 GPa, about 60 to about 100 GPa, or about 70 to about 90 GPa. Acoustic lens 100 formed from the plurality of CNTs can withstand submersion in liquid, heat and stress from the underwater plasma, and stress from the compression wave.

Each tubular shaped structure 101*a*, 101*b*, 101*c* to 101*n* can have a length and diameter configured to cause a phase shift of the compression wave. For example, if the length of a tubular structure is a multiple of half the wavelength of a sound wave, for example a compression wave, constructive interference can occur and result in a resonant condition leading to a stronger amplitude of the sound wave. If the length of the tube is a multiple of a full wavelength, destructive interference can occur leading to a phase shift of 180 degrees. The length of the tubular structure can also cause a phase shift due to the time it takes for the wave to travel from one end to the other end and back. The diameter of the tubular structure can also affect the speed of the sound wave, for example a compression wave, within it. Generally, the speed of the sound wave increases with decreasing diameter. Changes in the speed of the sound wave can further alter the wavelength for a given frequency leading to phase shifts. The diameter of the tubular structure can additionally affect the acoustic impedance of the tubular structure which can influence how efficiently the sound waves are transmitted or reflected at the boundaries of the tubular structure. This also can cause phase shifts of the sound wave. As a result varying the length and diameter of the tubular structures can tailor the conditions under which the compression wave propagates with the tubular structure leading to changes in wavelength, resonance conditions, and interference patterns, which can result in phase shifts of the compression wave. For example, tubular shaped structures 101*a*, 101*b*, 101*c* to 101*n* can have a diameter and length ranging from 0.2 to 10 mm, 1 to 8 mm, or 3 to 5 mm.

Figure 1B:
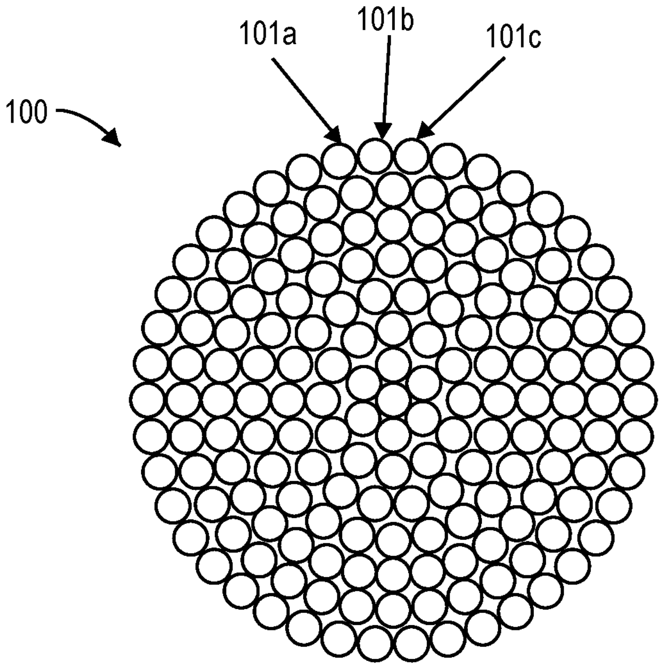
FIG. 1B schematically illustrates an end view of an acoustic lens, according to an implementation.

The side view of acoustic lens 100 in FIG. 1A further schematically depicts acoustic lens 100 having a concave shape at an incident side 110, the concave shape being formed by first ends of the array of tubular shaped structure. As will be described in more detail below, the underwater plasma generated compression wave radiates 360 degrees from the source. The concave shape at an incident side 110 of acoustic lens 100 serves to capture as much of the compression wave as possible for focusing towards the structure to be inspected. The top view of acoustic lens 100 in FIG. 1B schematically depicts the array of tubular structures 101*a*, 101*b*, 101*c* to 101*n* forming a circular shape. As will be described in more detail below, the circular shape can match the circular shape of one or more test vessels. For example, acoustic lens can have a diameter ranging from 2 to 20 cm, 5- to 15 cm, or 9 to 11 cm.

Figure 2A:
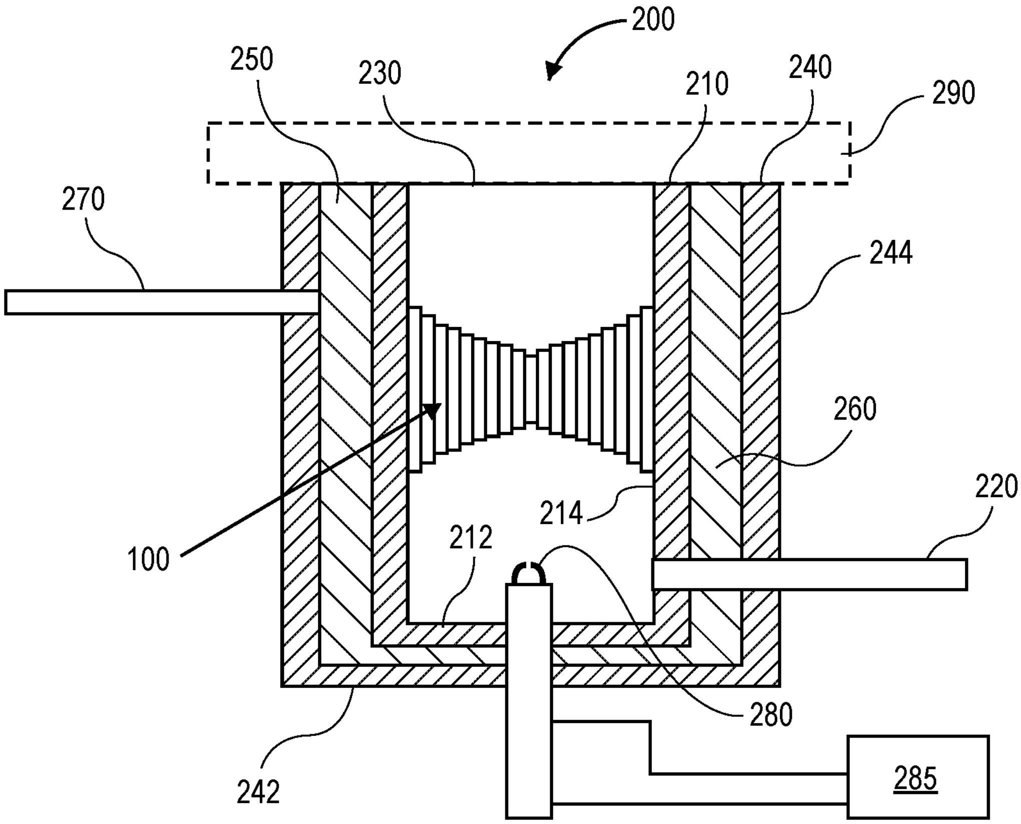
FIG. 2A schematically illustrates a cross-sectional view of a system for evaluating an adhesive bond in a bonded structure, according to an implementation.
Figure 2B:
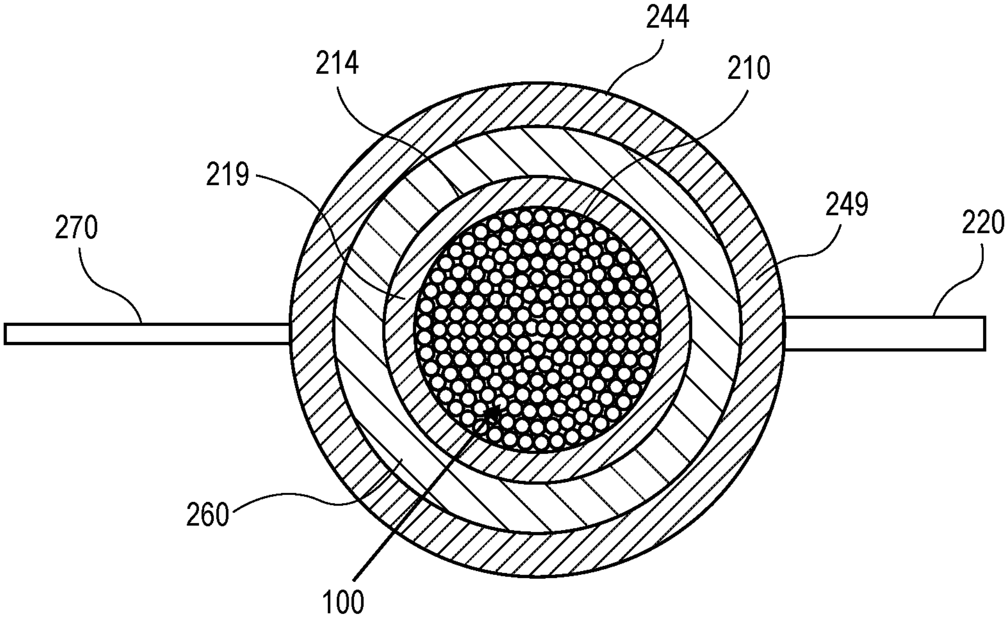
FIG. 2B schematically illustrates an end view of a system for evaluating a bond in an bonded structure, according to an implementation.

FIGS. 2A-B illustrate schematic views of a system 200 for evaluating a bond in a bonded structure using acoustic lens 100, according to an implementation. As shown in the cross-sectional schematic view of FIG. 2A, system 200 includes a first vessel 210 having an endwall 212, one or more sidewalls 214, and an open portion 230 opposite endwall 212. Open portion 230 can be an entire wall (e.g., an endwall) opposite endwall 212 or be a portion of the wall opposite endwall 212. First vessel 210 further includes a liquid port 220 that can be used to fill the first vessel with a liquid when connected to a source of liquid. As will be discussed in more detail below, first vessel 210 functions to contain the liquid and open portion 230 allows the liquid to contact a bonded structure to be inspected. A bonded structure 290 shown in FIG. 2A can be, for example, a structure formed by a first component and a second component that are bonded together by a bond as described in more detail below.

System 200 also includes a second vessel 240 having one or more sidewalls 244, an endwall 242, an open portion 250, and a vacuum port 270 that can be connected to a vacuum system. Second vessel 240 surrounds open portion 230 of first vessel 210, and may completely enclose first vessel 210 as shown in FIG. 2A. This allows a vacuum to be pulled in a space 260 between an outer surface of first vessel 210 and an inner surface of second vessel 240 when system 200 is placed in contact with a bonded structure 290 to be inspected. System 200 further includes a pair of electrodes 280 disposed in first vessel 210 and a power supply 285 connected to pair of electrodes 280.

Acoustic lens 100 is positioned within first vessel 210 between pair of electrodes 280 and bonded structure 290 to be inspected. According to implementations, acoustic lens 100 can match a diameter of first vessel 210 to allow acoustic lens to be secured in position by mounting on an interior of first vessel 210. Acoustic lens 100 can also match the diameter of first vessel 210 to capture and focus as much of the underwater plasma generated compression wave as possible towards bonded structure 290.

FIG. 2B shows an end view of system 200, specifically the end including the open portions that contacts bonded structure 290 to be inspected. During inspection, bonded structure 290 is placed over open portion 230 of first vessel 210 and open portion 250 of second vessel 240. First vessel 210 is filled with the liquid through liquid port 220 and a vacuum is pulled within space 260 via vacuum port 270. To keep the liquid within first vessel 210 from leaking and to facilitate establishing a vacuum in space 260, a seal 219 can optionally be included at an end of sidewall 214 adjacent to open portion 230 of first vessel 210. Similarly, a seal 249 can optionally be included at an end of sidewalls 244 adjacent to open portion 250 of second vessel 240. Although depicted as cylindrical in shape, one of ordinary skill in the art will understand that other shapes can be used, in particular, shapes that focus the compression wave towards the structure being inspected.

Figure 2C:
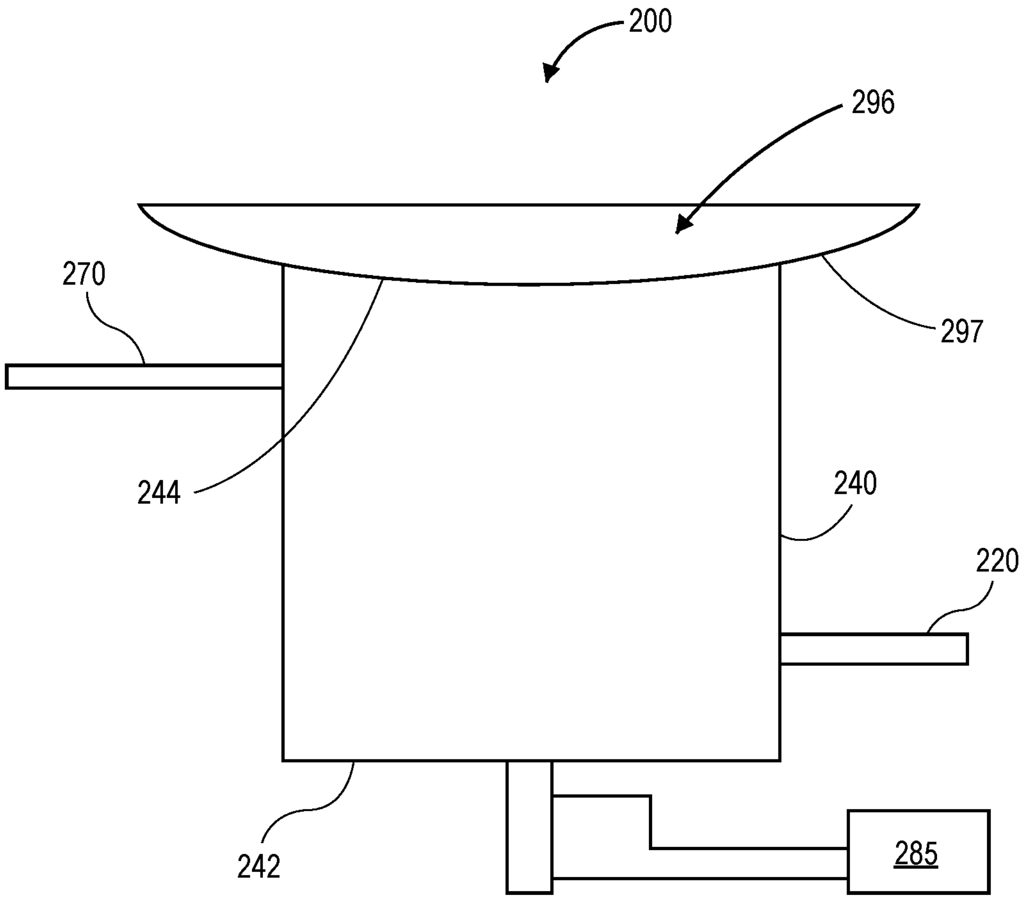
FIG. 2C schematically illustrates a side view of a system for evaluating a bond in an bonded structure having a curved surface, according to another implementation.

End of sidewall 214 at open portion 230 is depicted as planar to allow inspection of a bond within bonded structure 290 having a flat surface. A structure being inspected having a curved or shaped surface can be inspected by conforming ends of sidewalls of first vessel 210 and second vessel 240 to have a shape or curvature that matches a shape or curvature of the surface of the structure being inspected. As shown in FIG. 2C, a bonded structure 296 can have a surface 297 that is shaped or curved and an end of sidewall 244 of second vessel 240 can have a shape or curvature that matches the shape or curvature of surface 297 of bonded structure 296. Similarly, an end of sidewall 214 of first vessel 210 can have a shape or curvature that matches a shape or curvature of surface 297 of the bonded structure 296 being inspected. Ends of the sidewalls that match the shape or curvature of the surface of the structure being inspected allows first vessel 210 to be filled with the liquid without leakage and allows the vacuum to be pulled in space 260 between first vessel 210 and second vessel 240. This can optionally be accomplished by seals 219 and 249 having a curvature and/or shape to match the shape or curvature of the surface of the structure being inspected. One of ordinary skill in the art will understand that surface 297 that is shaped or curved may affect propagation of the compressive wave from the liquid in first vessel 210 into bonded structure 296 and that the pulse amplitude and/or pulse width of the compressive wave may need to be adjusted using lens 100. The focal point can also be adjusted as needed to account for a curved inspection surface.

As disclosed above, system 200 further includes a pair of electrodes 280 disposed in first vessel 210 and a power supply 285 connected to pair of electrodes 280. As used herein, pair of electrodes refers to an anode and a cathode separated by a gap. Pair of electrodes 280 can be, for example, part of a spark plug, e.g., a spark plug for a combustion engine. Pair of electrodes 280 are positioned so that the compression wave generated in the liquid can propagate towards acoustic lens 100 and the structure being inspected. For example, pair of electrodes 280 can be positioned in front of open portion 230 of first vessel 210 so that the compression wave can propagate through open portion 230 into the structure being inspected. Power supply 285 supplies an electrical pulse to initiate the spark discharge at electrodes 280. The electrical pulse generates a compression wave with high amplitude and short pulse width for bond inspection, for example, high amplitude and short pulse. Power supply 285 can provide about 40 kV to about 60 kV to pair of electrodes 280 and can be, for example, one or more banks of capacitors. The one or more banks of capacitors can be variable capacitors including time delay capability. Power supply 285 can also provide a voltage (e.g., and electrical pulse) via a transformer to produce arcing at pair of electrodes 280 at a desired voltage. Examples of transformers include, but are not limited to, an oscillator transformer and flyback transformer. Power supply 285 can also be a Van de Graaff belt high voltage electrostatic generator or other sources of an electrical pulse. One of ordinary skill in the art will understand that system 200 can include other components for providing the electrical pulse to pair of electrodes including, but not limited to, a waveform generator, a synchronization circuit, and a driver.

Figure 2D:
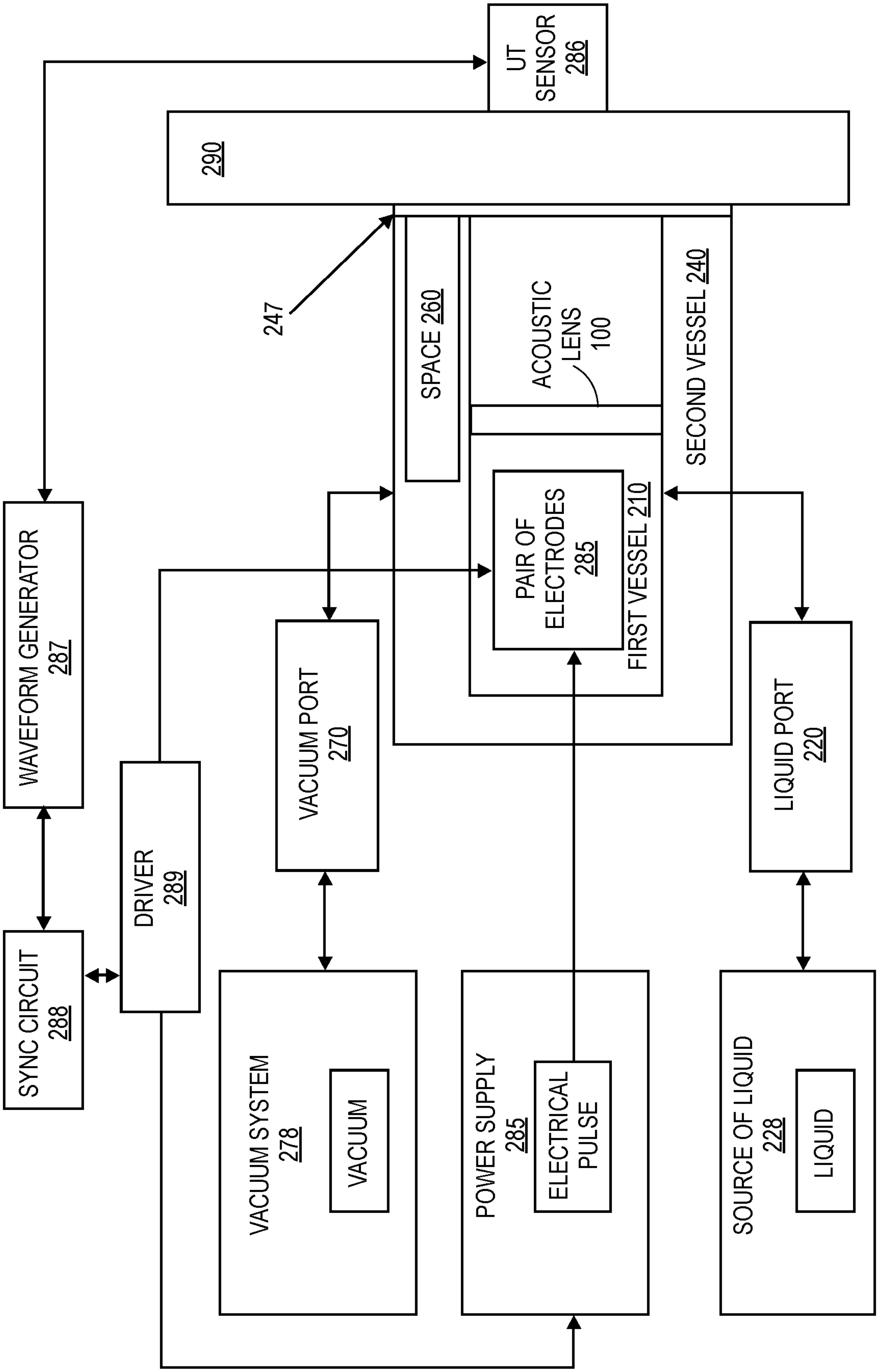
FIG. 2D is a functional block diagram of a system for evaluating an adhesive bond in a bonded structure, according to an implementation.

FIG. 2D is a function block diagram of an example system 200 for evaluating a bond in a bonded structure using underwater spark discharge. System 200 is placed adjacent to bonded structure 290. A vacuum system 277 can pull a vacuum in space 260 in second vessel 240 via vacuum port 270. The vacuum secures system 200 against a surface of bonded structure 290 and seals 247 prevent loss of vacuum from space 260. A source of liquid 228 can fill first vessel 210 with a liquid via liquid port 240. Seals 247 can prevent the liquid from leaking out of first vessel 210 to avoid the presence of an air gap/pocket in first vessel 210 that could affect propagation of the compressive wave into bonded structure 290. Power supply 285 can provide an electrical pulse to pair of electrodes 285 that results in a spark discharge that generates a plasma between pair of electrodes 285.

System 200 can further include an ultrasonic (UT) sensor 286, a waveform generator 287, a synchronization circuit 288, and a driver 289. UT sensor 286 can be used as a pulse-echo inspection mechanism which allows capture of an ultrasonic signal before and after the bond in the bonded structure is subject to the compression wave generated by the underwater plasma. By subtracting the two signals, the extent of damage or failure to the bond in the bonded structure can be determined. UT sensor 286 can further be used to monitor the intensity of the compression wave generated by the underwater plasma before it reflects from a surface and becomes a tension wave. Used as a high-frequency probe, UT sensor 286 can measure the amplitude and period of the single compression wave generated by the plasma.

Synchronization circuit 288 serves as a triggering mechanism for collecting data from the UT sensor 286 at a very high sampling rate just before and after the plasma discharge. This allows for taking data only during testing of the bond in the bonded structure. Waveform generator 287 provides controlled electric pulses to the UT sensor 286 for high sampling rate pulsed echo detection of the compression wave.

The spark discharge generates a compression wave that propagates from the liquid to acoustic lens 100 that focuses the compression wave towards bonded structure 290 to apply a force to the bond. Subsequent to applying the force to the bond, source of liquid 228 can remove the liquid from first vessel 210 and vacuum system 278 can remove the vacuum from second vessel 240 to release the system from bonded structure 290.

Figure 3:
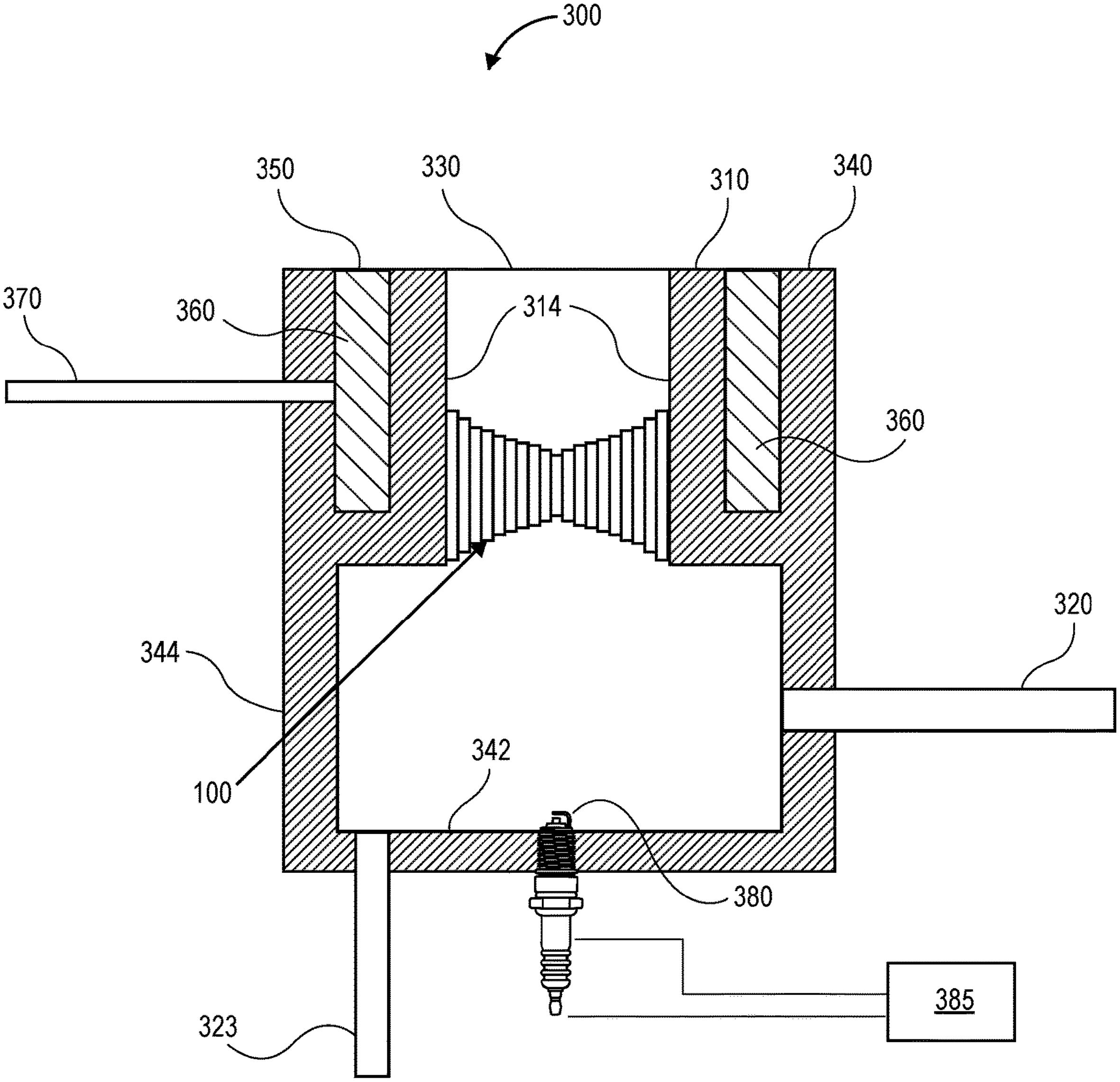
FIG. 3 schematically illustrates a cross-sectional view of a system for evaluating an adhesive bond in a bonded structure, according to another implementation.

FIG. 3 illustrates a cross-sectional view of a system 200 for evaluating a bond in a bonded structure in which a first vessel and a second vessel share common sidewalls and/or a common endwall, according to another implementation. System 300 includes a second vessel 240 having one or more sidewalls 244, an endwall 242, and an open portion 250 opposite endwall 242. Second vessel 240 also includes a vacuum port 270 that can pull a vacuum in space 260 when connected to a vacuum system. System 200 also includes a first vessel 210 having an endwall 242, one or more sidewalls 214, 244, and an open portion 230 that is opposite endwall 242. First vessel 210 further includes a liquid port 220 that can fill the first vessel with a liquid when connected to a source of liquid. First vessel 210 can optionally include an air vent 223 to remove air, for example in the form of bubbles, when first vessel 210 is filled with the liquid.

As shown in FIG. 3, second vessel 340 and first vessel 310 share endwall 342. Second vessel 340 also shares a portion of sidewall 344 with first vessel 310. In other words, endwall 342 functions as an endwall for both first vessel 310 and second vessel 340. Similarly, sidewall 344 functions as a sidewall for second vessel 340 and a portion of sidewall 344 also functions as a side wall for first vessel 310.

During inspection, a bonded structure is placed over open portion 330 of first vessel 310 and open portion 350 of second vessel 340. First vessel 310 is filled with the liquid through liquid port 320 and a vacuum is pulled within space 360 via vacuum port 370. Seals optionally located at the ends of the sidewalls that contact the bonded structure can keep the liquid within first vessel 310 from escaping and facilitate establishing a vacuum in space 360. Pair of electrodes 380, for example, part of a spark plug, immersed in the liquid are provided with an electrical pulse from a power supply 385. The electrical arc formed between pair of electrodes 380 generates a plasma within the liquid that in turn generates a compression wave directed towards the bonded structure through open portion 330 of first vessel 310. Acoustic lens 100 can be disposed between pair of electrodes 380 and open portion 330 where a structure to be inspected would be placed. While acoustic lens can be placed in any location between pair of electrodes 380 and open portion 330 where a structure to be inspected would be placed, placement of acoustic lens 100 should focus the underwater plasma generated compression wave towards a focal point at or near the surface of a structure being inspected and minimize interference from reflections of the compression wave from sidewalls and/or endwalls of first vessel 310 and second vessel 340.

Figure 4:
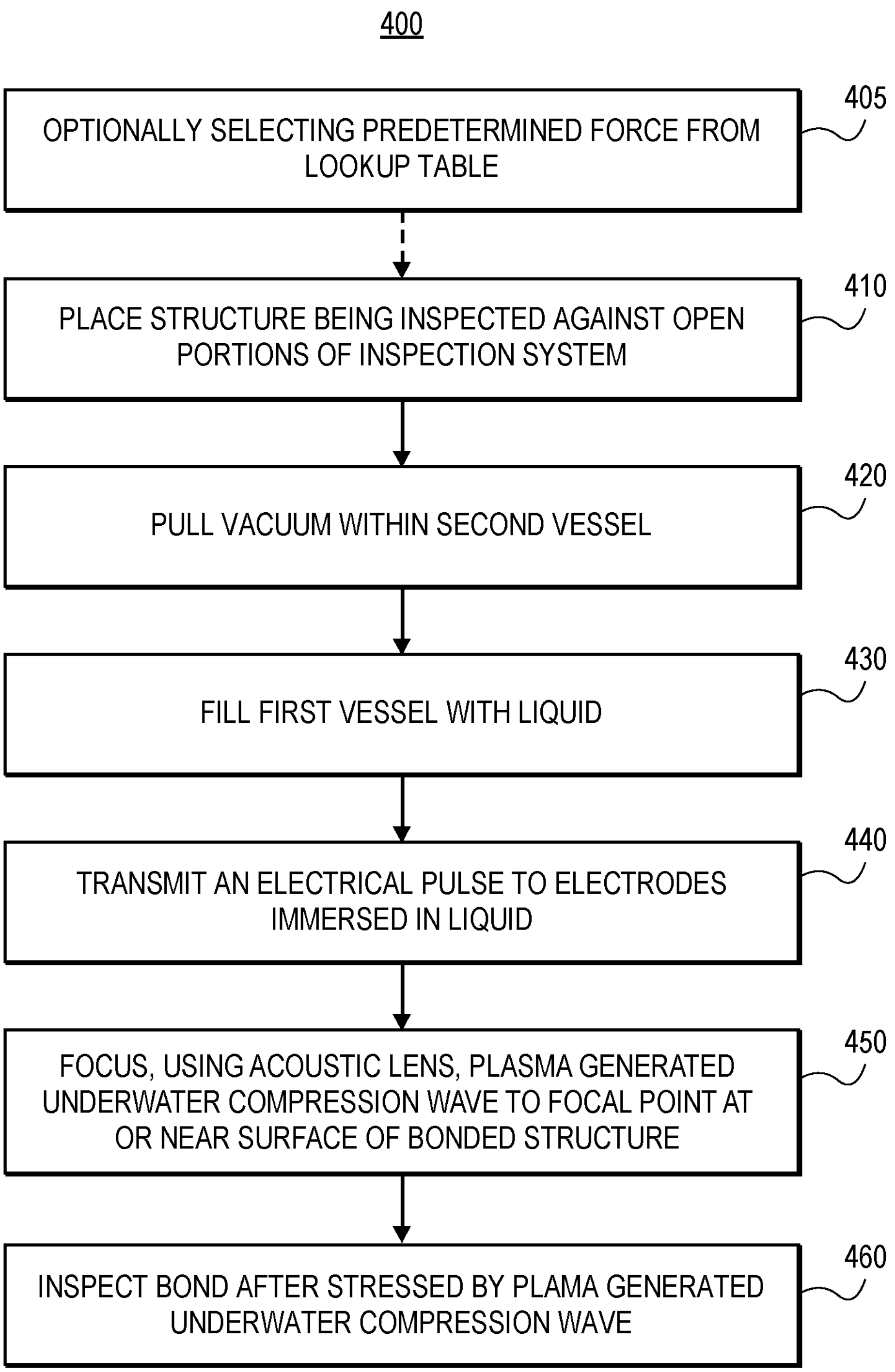
FIG. 4 is a flowchart of a method for evaluating a bond in a bonded structure, according to an implementation.

FIG. 4 is a flowchart illustrating a method 400 for evaluating a bond in a structure using an acoustic lens, according to an implementation.

Method 400 can optionally begin at 405 by selecting a predetermined force to apply to a bond in a bonded structure. The predetermined force can be from about 30% to about 70% of a force required to break the bond, from about 40% to about 60% of a force required to break the bond, or from about 45% to about 55% of a force required to break the bond. For example, the predetermined force can be about 50% of a force required to break the bond. The predetermined force can be selected from a lookup table constructed from results of lap shear testing and/or peel ply testing of the composite materials forming the bond in the bonded structure. Once the predetermined force is selected, a nominal pulse energy and pulse width for the compression wave can be determined based on the materials comprising the bond in the bonded structure. For example, if 50% of the force required to break a bond is 0.5 MPa, a compression wave can have an energy of about 1 MPa and a pulse width of about 0.1 to about 10 nanoseconds.

Figure 5:
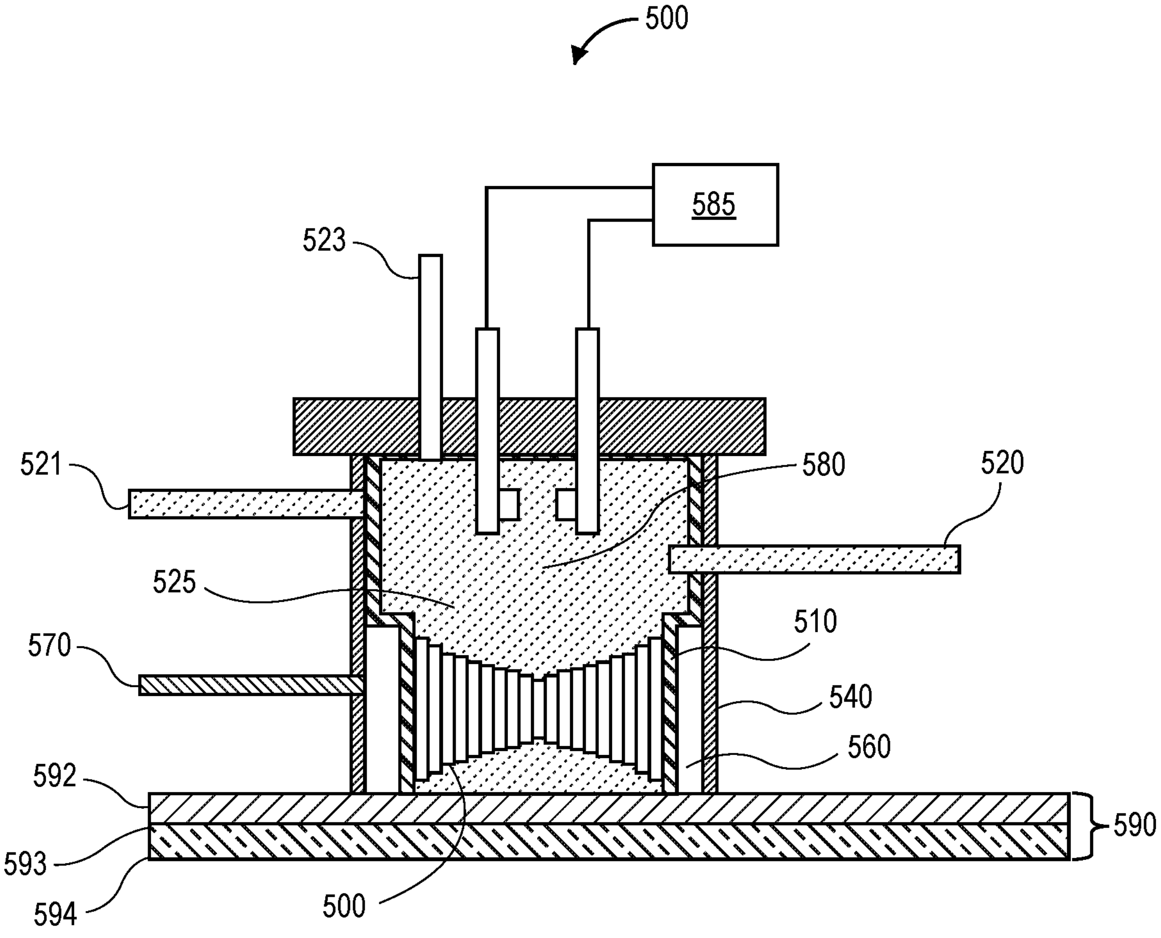
FIG. 5 schematically illustrates a cross sectional view of a system for evaluating a bond in a bonded structure, according to an implementation.

At 410 of method 400, a system for evaluating a bond as disclosed herein can be placed against a structure to be inspected. Referring to FIG. 5 that schematically illustrates operation of a system as disclosed herein, a system 500 for evaluating a bond can be placed against a structure 590 being inspected. Structure 590 can be, for example, a structure formed by a first component 592 and a second component 594 that are bonded together by a bond 593. First component 592 and second component 594 can be, for example, layers within a composite structure. As will be appreciated, there may be more components that are bonded together, but for simplicity, only two components are illustrated. In some examples, first component 592 and second components 594 are made at least partially from CFRP. In other examples, first component 592 is made at least partially from CFRP, and second component 594 is made at least partially from metal. Bond 593 can include a bond material such as a resin, an adhesive, or an epoxy (e.g., boron epoxy or carbon epoxy).

System 500 is placed against structure 590 so that open portions of a first vessel 510 and a second vessel 540 are closed by structure 590. In other words, structure 590 closes open portions of first vessel 510 to allow liquid to fill first vessel 510 and to contact a surface of structure 590. Structure 590 also closes open portions of second vessel 540 to allow a vacuum to be pulled in second vessel 540, for example, in space 560 between the inside of a sidewall of second vessel 540 and an outside of a sidewall of first vessel 510.

At 420 of method 400, a vacuum is pulled within second vessel 540. Referring to FIG. 5, the vacuum is pulled in space 560 of second vessel 540 via a vacuum port 570 connected to a vacuum system. The vacuum holds first vessel 510 and second vessel 540 against structure 590 to create a watertight chamber within first vessel 510 and to keep system 500 from moving during inspection, for example, when a compression wave is generated. The vacuum also enables system 500 to be placed in various orientations where system 500 may held against structure 590 by the vacuum, for example, where structure 590 includes a vertical or angled surface to be inspected. Seals, sealant materials, or gaskets can be disposed between ends of the sidewalls adjacent to the open portions and structure 590 to assist pulling and retaining the vacuum and/or to prevent leakage of the liquid. The vacuum further allows system 500 to be placed with open portion of first vessel 510 at various orientations, such as facing up as shown in FIGS. 2A, 2C and 2, facing down as shown in FIG. 5, or facing sideways at any angle.

At 430 of method 400, the first vessel is filled with a liquid. Referring to FIG. 5, first vessel 510 is filled with a liquid 525 via a liquid port 520 connected to a source of liquid. Liquid 525 can be water, for example, deionized water, or an oil, such as a mineral oil or a nonconductive oil. Liquid 525 serves as a medium to generate and propagate a compression wave generated by the underwater spark discharge. First vessel 510 can optionally be filled with the liquid to a pressure up to about 100 psi, for example from about 5 to about 90 psi, or from about 10 to about 75 psi. The pressure within first vessel 510 can increase an amplitude of the compression wave generated at 440 of method 400 below. System 500 can also optionally include additional liquid ports, for example, a second liquid port 521 to increase the speed of filling and emptying vessel 510 and/or to prevent contamination of the source of liquid due to breakdown of the liquid by the plasma. System 500 can also optionally include an air vent 523 configured allow removal of air, for example, air bubbles, from vessel 510. Valves capable of withstanding the stress wave generated by system 500 can be used to close off system 500 at air vent 523, liquid ports 520, 512, and/or vacuum port 570. Examples of suitable valves include, but are not limited to, actuated valves and mechanical valves.

At 440 of method 400, an electrical pulse is transmitted to a pair of electrodes that are immersed in the liquid in first vessel 510 to initiate a spark discharge. Referring again to FIG. 5, a pair of electrodes 580 is immersed in liquid 525 within first vessel 510. In other implementations, the pair of electrodes can be modified to generate different pulse widths, electrical arcs with different properties, stress waves with different properties, or a combination thereof. For example, one or both of the electrodes of the pair of electrodes can be replaced with different electrode(s) that are made of a different material and/or have a different size/shape. In addition, the positioning of the electrodes, for example, a gap length between the electrodes can be varied to alter and/or control the plasma. For example, the gap length between the pair of electrodes and/or the liquid density can selected or modified to control the spark discharge which affects parameters of the compression wave, for example, its pulse width, frequency, and power (dB).

The electrical pulse is provided by a power supply 585, for example, a bank of capacitors, a voltage induction source, or voltage switching source, provides a voltage capable of forming an underwater plasma that generates a high amplitude, short wavelength compression wave for bond inspection. The high amplitude, short wavelength compression wave can have a pulse width of about 100 ns to about 300 ns and an energy of about 5 to about 40 Joules. The high amplitude, short wavelength compression wave can further be comparable to a compression wave generated during LBI inspection. Power supply 585 can provide about 40 kV to about 60 kV to pair of electrodes 480 to generate the underwater plasma and the resulting compression wave having a duration or pulse width of about 100 ns to about 300 ns and an energy of about 5 to about 40 Joules.

Although not wishing to be bound by any particular theory, it is believed that the electrical pulse when transferred to the pair of electrodes causes a high intensity electric field across the gap of the pair of electrodes within the liquid. This results in ionization of the liquid molecules and formation of a gaseous plasma. High temperature and pressure generated by the plasma and opposed by the liquid, results in an acoustic wave, e.g., a compression wave, that propagates outwards with an amplitude sufficient to change the density of the liquid.

The underwater plasma generated compression wave propagates through liquid 525 towards acoustic lens 500. Acoustic lens 500 focuses the compression wave towards a focal point, at or near a surface of structure 590. For example, the focal point can be within first component 592, at a surface of first component 592, or in liquid 525 near the surface of first component 492 of structure 490. The focused compression wave propagates through first component 592 and applies a force, optionally the predetermined force, to bond 593. The predetermined force applied by the focused compression wave can be controlled by, for example, the length of the gap between the electrodes, the size and width of electrical pulse, and size and shape of the first vessel, and/or the liquid in the vessel. A further force can be applied to bond 593 from a reflected compression wave, or tension wave, after the focused compression wave is reflected from a surface of first component 592, a surface of second component 594, and/or bond 593.

At 440 of method 400, the bond can be inspected. For example, bond 593 can be inspected with a non-destructive inspection (NDI) system including but not limited to an ultrasound imaging system or an ultrasonic inspection system. The inspection detects inconsistencies and/or damage to the bond that occurs in response to the compression wave and/or a reflected compression wave reflected from a back surface of the structure. If the inspection reveals that bond 593 is fractured or broken, then the quality of the bond is determined to be bad (i.e., the bond did not pass inspection). If the inspection reveals that bond 593 (e.g., material forming the bond) is not fractured or broken, then the quality of the bond is determined to be good (i.e., the bond passes inspection). Such an inspection of the bond is comparable to inspection by laser bond inspection and ASTM D5528-13-Standard Test Method for Mode 1 Interlaminar Fracture Toughness of Unidirectional Fiber-reinforced Polymer matrix composites. Alternative or additional steps may also be performed.

The disclosed system and method can replace destructive testing such as peel ply testing and/or lap shear testing which use mechanically applied stress to pull a bond apart. The disclosed system and method can also replace laser bond testing, which uses an expensive and large laser/power supply and further requires a sacrificial material for ablation to generate a compression wave.

Further, the disclosure comprises examples according to the following clauses:

Clause 1. An acoustic lens comprising: an array of tubular shaped structures, wherein each tubular shaped structure of the array comprises a length and a diameter, a long axis of each tubular shaped structure of the array is oriented in a same direction, the array of tubular shaped structures is formed of a plurality of carbon nanotubes; an incident side of the acoustic lens formed by a first end of the array of tubular shaped structure comprises a concave shape, and the length and the diameter of each tubular shaped structure of the array are configured to phase shift a compression wave.

Clause 2. The acoustic lens of claim 1, wherein the width and the length of each tubular shaped structure of the array phase shifts the compression wave to focus the compression wave to a focal point.

Clause 3. The acoustic lens of claim 2, wherein the focal point is at, near, or within a surface of a composite material being inspected.

Clause 4. The acoustic lens of claim 1, wherein the diameter and the length of each tubular shaped structure of the array phase shifts the compression wave to collimate the compression wave.

Clause 5. The acoustic lens of claim 1, wherein the array of tubular shaped structures comprises a stiffness of 0.1 to 5.0 TPa.

Clause 6. The acoustic lens of claim 1, wherein the array of tubular shaped structures comprises a tensile strength of 50 to 200 GPa.

Clause 7. The acoustic lens of claim 1, wherein the plurality of carbon nanotubes comprise multi-walled carbon nanotubes, single-walled carbon nanotubes, or a mixture thereof.

Clause 8. The acoustic lens of claim 1, wherein a cross sectional shape of the acoustic lens is circular.

Clause 9. The acoustic lens of claim 1, wherein a diameter of the acoustic lens is from about 0.2 mm to about 10 mm.

Clause 10. A method for evaluating a bond, comprising: placing an open portion of a first vessel against a bonded structure being inspected; pulling a vacuum between an outer surface of the first vessel and an inner surface of a second vessel that encloses the first vessel, wherein pulling the vacuum seals the first vessel to the bonded structure; filling the first vessel with a liquid, wherein the liquid contacts a surface of the bonded structure to be inspected at the open portion; initiating a spark discharge in the liquid to form a plasma that generates a compression wave in the liquid, using an acoustic lens to focus the compression wave to a focal point at or near the surface of the bonded structure to apply a force to a bond in the bonded structure; and inspecting the bond in the bonded structure.

Clause 11. The method of claim 10, wherein the acoustic lens is disposed between the surface of the bonded structure and a pair of electrodes that initiate the spark discharge.

Clause 12. The method of claim 10, wherein the acoustic lens comprises an array of tubular shaped structures formed of carbon nanotubes, wherein a long axis of each tubular shaped structure of the array is oriented in a same direction, and a length and diameter of each tubular shaped structure is configured to phase shift the compression wave to a focal point.

Clause 13. The method of claim 10, wherein the bond in the bonded structure comprises a metal-to-composite adhesive bond or a composite-to-composite adhesive bond.

Clause 14. The method of claim 10, wherein pulling the vacuum between the outer surface of the first vessel and the inner surface of a second vessel comprises compressing seals disposed between the first vessel and the bonded structure and compressing seals disposed between the second vessel and the bonded structure.

Clause 15. The method of claim 10, wherein filling the first vessel with a liquid comprises filling the first vessel with water or oil.

Clause 16. The method of claim 10, wherein filling the first vessel with the liquid comprises introducing a pressure of up to about 100 psi in the first vessel.

Clause 17. The method of claim 10, wherein initiating the spark discharge in the liquid comprises supplying about 40 kV to about 60 kV to a pair of electrodes disposed in the first vessel.

Clause 18. The method of claim 10, wherein initiating the spark discharge in the liquid to form the plasma generates a compression wave in the liquid having a pulse width of about 100 ns to about 300 ns.

Clause 19. The method of claim 10, wherein the force applied to the bond by the compression wave is from about 30% to about 70% of a force required to break the bond.

Clause 20. A system for evaluating a bond comprising: a first vessel comprising, one or more sidewalls and an endwall, a liquid port configured to connect to a source to fill the first vessel with a liquid, and an open portion configured to be placed against a bonded structure to be inspected; a second vessel surrounding the open portion of the first vessel, comprising a vacuum port configured to connect to a vacuum system to pull a vacuum in a space between an outer surface of the first vessel and an inner surface of the second vessel when the open portion of the first vessel and an open portion of the second vessel are adjacent to the bonded structure to be inspected; a pair of electrodes disposed within the first vessel and positioned to generate a compression wave in the liquid within the first vessel directed towards the bonded structure to be inspected, and an acoustic lens disposed within the first vessel between the pair of electrodes and the open portion, wherein the acoustic lens comprises an array of tubular shaped structures formed of carbon nanotubes, and wherein a length and diameter of each tubular shaped structure is configured to phase shift the compression wave.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. As used herein, the terms "a", "an", and "the" may refer to one or more elements or parts of elements. As used herein, the terms "first" and "second" may refer to two different elements or parts of elements. As used herein, the term "at least one of A and B" with respect to a listing of items such as, for example, A and B, means A alone, B alone, or A and B. Those skilled in the art will recognize that these and other variations are possible. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the intended purpose described herein. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. An acoustic lens comprising:
- an array of tubular shaped structures, wherein
  - each tubular shaped structure of the array comprises a length and a diameter,
  - a long axis of each tubular shaped structure of the array is oriented in a same direction,
  - the array of tubular shaped structures is formed of a plurality of carbon nanotubes;
  - an incident side of the acoustic lens formed by a first end of the array of tubular shaped structure comprises a concave shape, and
  - the length and the diameter of each tubular shaped structure of the array are configured to phase shift a compression wave.

2. The acoustic lens of claim 1, wherein the width and the length of each tubular shaped structure of the array phase shifts the compression wave to focus the compression wave to a focal point.

3. The acoustic lens of claim 2, wherein the focal point is at, near, or within a surface of a composite material being inspected.

4. The acoustic lens of claim 1, wherein the diameter and the length of each tubular shaped structure of the array phase shifts the compression wave to collimate the compression wave.

5. The acoustic lens of claim 1, wherein the array of tubular shaped structures comprises a stiffness of 0.1 to 5.0 TPa.

6. The acoustic lens of claim 1, wherein the array of tubular shaped structures comprises a tensile strength of 50 to 200 GPa.

7. The acoustic lens of claim 1, wherein the plurality of carbon nanotubes comprise multi-walled carbon nanotubes, single-walled carbon nanotubes, or a mixture thereof.

8. The acoustic lens of claim 1, wherein a cross sectional shape of the acoustic lens is circular.

9. The acoustic lens of claim 1, wherein a diameter of the acoustic lens is from about 0.2 mm to about 10 mm.

10. A method for evaluating a bond, comprising:

placing an open portion of a first vessel against a bonded structure being inspected;

pulling a vacuum between an outer surface of the first vessel and an inner surface of a second vessel that encloses the first vessel, wherein pulling the vacuum seals the first vessel to the bonded structure;

filling the first vessel with a liquid, wherein the liquid contacts a surface of the bonded structure to be inspected at the open portion;

initiating a spark discharge in the liquid to form a plasma that generates a compression wave in the liquid, using an acoustic lens to focus the compression wave to a focal point at or near the surface of the bonded structure to apply a force to a bond in the bonded structure; and inspecting the bond in the bonded structure.

11. The method of claim 10, wherein the acoustic lens is disposed between the surface of the bonded structure and a pair of electrodes that initiate the spark discharge.

12. The method of claim 10, wherein the acoustic lens comprises an array of tubular shaped structures formed of carbon nanotubes, wherein a long axis of each tubular shaped structure of the array is oriented in a same direction, and a length and diameter of each tubular shaped structure is configured to phase shift the compression wave to a focal point.

13. The method of claim 10, wherein the bond in the bonded structure comprises a metal-to-composite adhesive bond or a composite-to-composite adhesive bond.

14. The method of claim 10, wherein pulling the vacuum between the outer surface of the first vessel and the inner surface of a second vessel comprises compressing seals disposed between the first vessel and the bonded structure and compressing seals disposed between the second vessel and the bonded structure.

15. The method of claim 10, wherein filling the first vessel with a liquid comprises filling the first vessel with water or oil.

16. The method of claim 10, wherein filling the first vessel with the liquid comprises introducing a pressure of up to about 100 psi in the first vessel.

17. The method of claim 10, wherein initiating the spark discharge in the liquid comprises supplying about 40 kV to about 60 kV to a pair of electrodes disposed in the first vessel.

18. The method of claim 10, wherein initiating the spark discharge in the liquid to form the plasma generates a compression wave in the liquid having a pulse width of about 100 ns to about 300 ns.

19. The method of claim 10, wherein the force applied to the bond by the compression wave is from about 30% to about 70% of a force required to break the bond.

20. A system for evaluating a bond comprising:

a first vessel comprising, one or more sidewalls and an endwall, a liquid port configured to connect to a source to fill the first vessel with a liquid, and an open portion configured to be placed against a bonded structure to be inspected;

a second vessel surrounding the open portion of the first vessel, comprising a vacuum port configured to connect to a vacuum system to pull a vacuum in a space between an outer surface of the first vessel and an inner surface of the second vessel when the open portion of the first vessel and an open portion of the second vessel are adjacent to the bonded structure to be inspected;

a pair of electrodes disposed within the first vessel and positioned to generate a compression wave in the liquid within the first vessel directed towards the bonded structure to be inspected, and an acoustic lens disposed within the first vessel between the pair of electrodes and the open portion, wherein the acoustic lens comprises an array of tubular shaped structures formed of carbon nanotubes, and wherein a length and diameter of each tubular shaped structure is configured to phase shift the compression wave.

* * * * *